Jan. 6, 1953     F. E. HOOVER     2,624,254
POWER DISK PLOW
Filed July 15, 1949
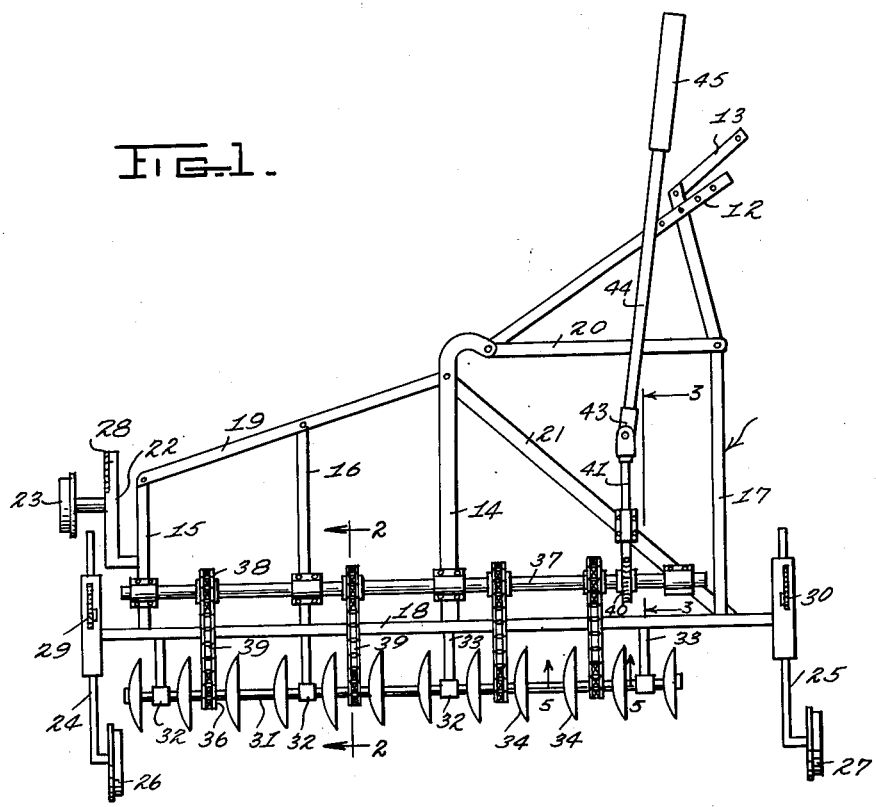
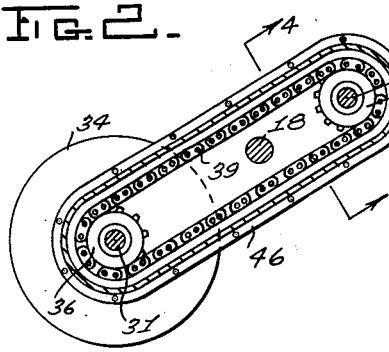
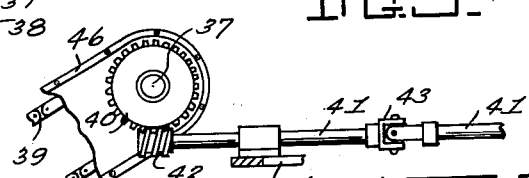
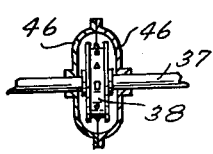
INVENTOR.
FERMEN E. HOOVER
BY
McMorrow, Berman & Davidson
ATTORNEYS Patented Jan. 6, 1953

2,624,254

UNITED STATES PATENT OFFICE 2,624,254

POWER DISK PLOW

Fermen E. Hoover, Brewster, Kans.

Application July 15, 1949, Serial No. 104,860

1 Claim. (Cl. 97—40)

This invention relates to agricultural machines, and more particularly to tractor plows.

A main object of the invention is to provide a novel and improved tractor-drawn plow of the type adapted to be connected to a tractor and to follow the tractor over the area to be plowed, the machine being very simple in construction, reducing the tractive load on the tractor, and providing a more uniform plowing and harrowing action than is obtained in tractor plows of the conventional type.

A further object of the invention is to provide an improved tractor-drawn plowing machine which is relatively inexpensive to manufacture, which enables loose ground and heavy stubble to be traversed where ordinary disc plows would be inefficient, and which provides improved traction over loose soil and over areas containing stubble and trash, reducing the time required for plowing, and providing more economical fuel consumption for the tractor.

Further objects and advantages of the invention will become apparent from the following description and claim, and from the accompanying drawings, wherein:

Figure 1 is a top plan view of a plowing attachment constructed in accordance with the present invention;

Figure 2 is an enlarged cross-sectional view taken on line 2—2 of Figure 1, showing guard housings for the sprocket chain;

Figure 3 is an enlarged cross-sectional view taken on line 3—3 of Figure 1;

Figure 4 is a cross-sectional view taken on line 4—4 of Figure 2;

Figure 5 is an enlarged cross-sectional view taken on line 5—5 of Figure 1.

Referring to the drawings, 11 designates a frame which is generally conventional in construction, said frame being provided with hitch bars 12 and 13 for connection to the drawbar members of a tractor. The frame 11 includes a central longitudinal bar element 14 and additional longitudinal bar elements 15, 16 and 17. Connected to the rear ends of the longitudinal bar elements is a transverse bar 18. The forward end portions of bar elements 15, 16 and 14 are connected by an inclined frame bar 19. The forward end portions of bar elements 14 and 17 are connected by a transverse frame bar 20. A diagonal brace strut 21 connects the rear end of bar element 17 to the forward end portion of bar element 14. Adjustably secured to side bar 15 is a conventional caster member 22 provided with a ground-engaging wheel 23. Secured to the ends of transverse frame bar 18 are additional adjustable caster structures 24 and 25 provided with the respective ground-engaging wheels 26 and 27.

The respective caster structures 22, 24 and 25 include conventional manually-operated means shown at 28, 29 and 30 for lowering or raising the ground-engaging wheels with respect to the frame.

Designated at 31 is a transverse shaft rotatably journaled in spaced bearing sleeves 32 carried on arms 33 secured to and extending downwardly and rearwardly from the transverse frame bar 18. Secured to shaft 31 are the spaced plow discs shown at 34.

As shown in Figure 5, adjacent pairs of discs 34 may be carried on sleeves 35 secured on shaft 31, each sleeve having secured on its central portion a sprocket wheel 36. Designated at 37 is a transverse shaft journaled on the rear portion of frame 11, carrying sprocket wheels 38 longitudinally aligned with the respective sprocket wheels 36 and coupled thereto by respective sprocket chains 39. Adjacent one end thereof, shaft 37 carries a worm gear 40. Rotatably supported on the diagonal bar 21 is a longitudinal shaft 41 carrying a worm 42 which meshes with worm gear 40. Connected to shaft 41 by a universal joint 43 is a drive shaft 44 provided at its end with a coupling sleeve 45 adapted to be coupled to the power take-off shaft of the tractor. Sleeve 45 may be slidable and non-rotative on shaft 44 to enable the frame 11 to swing horizontally with respect to the tractor without uncoupling the power take-off shaft from the drive shaft 44.

As shown in Figures 2, 3 and 4, suitable housing elements 46, 46 may be provided around the chains 39 and sprocket wheels 36, 38, said housing elements being fastened together and rotatively receiving the shafts 37 and 31.

It will be seen that the plow discs 34 are rotated in unison by the tractor power take-off shaft through drive shaft 44, universal joint 43, worm shaft 41, worm 42, gear 40, shaft 37, sprockets 38, chains 39, sprockets 36 and shaft 31. The rotation of the discs provides increased traction for the machine, as well as preventing loose soil and trash from piling up adjacent the discs and interfering with the plowing action thereof. Therefore, plowing is greatly accelerated and fuel consumption of the tractor is substantially reduced. Sliding or dragging of the plow discs is also eliminated.

While a specific embodiment of an improved plowing attachment of the disc type for use with tractors has been disclosed in the foregoing description, it is to be understood that various modifications within the spirit of the invention may occur to those skilled in the art. Therefore, it is intended that no limitations be placed on the invention except as defined by the scope of the appended claim.

What is claimed is:

A plow for attachment to a tractor comprising a mobile horizontally disposed frame, including a pair of spaced longitudinally extending bars and a transversely disposed bar extending between and connected to said pair of bars adjacent one end thereof, each of the ends of said first transverse bar projecting beyond the adjacent longitudinal bar, a caster connected to each of the projecting ends of said transverse bar, a third caster positioned to one side of and spaced from one of said longitudinal bars and the adjacent one of said casters and connected to said longitudinal bar, a first transversely disposed shaft positioned forwardly of and spaced from said transverse bar and rotatably supported on said longitudinal bars, a second transversely disposed shaft arranged rearwardly of and spaced from said transverse bar and said first shaft and rotatably and dependingly supported from said transverse bar, a plurality of plow discs arranged in spaced relation along said second shaft and secured on said second shaft for rotation therewith, a plurality of sprocket wheels arranged in spaced relation along said first shaft intermediate the ends thereof and connected to the last named shaft for rotation therewith, a plurality of sprocket wheels on said second shaft, each of the sprocket wheels on said second shaft being interposed between adjacent plow discs and in alignment with the adjacent sprocket wheel on said first shaft, chains drivingly connecting the aligned sprocket wheels, a worm gear on said first shaft adjacent one end thereof, a driven shaft arranged transversely of said first shaft adjacent said worm gear, a worm on said driven shaft and in meshing engagement with said worm gear, and means connecting said driven shaft to a power source.

FERMEN E. HOOVER.

REFERENCES CITED

The following references are of record in the file of this patent:

UNITED STATES PATENTS

| Number | Name | Date |
|---|---|---|
| 1,475,455 | Skinner et al. | Nov. 27, 1923 |
| 2,214,702 | Seaman | Sept. 10, 1940 |

FOREIGN PATENTS

| Number | Country | Date |
|---|---|---|
| 328,115 | Germany | Oct. 21, 1920 |
| 574,393 | Germany | Apr. 12, 1933 |